US006900560B2

(12) United States Patent
Ji

(10) Patent No.: US 6,900,560 B2
(45) Date of Patent: May 31, 2005

(54) HOLDABLE MULTI-FUNCTIONAL ROTARY DEVICE

(76) Inventor: Hua-Sern Ji, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 10/213,302

(22) Filed: Aug. 7, 2002

(65) Prior Publication Data

US 2004/0027009 A1 Feb. 12, 2004

(51) Int. Cl.7 .................................................. H02K 7/14

(52) U.S. Cl. ............................. 310/50; 310/47; 310/46; 310/53; 310/75 R; 74/354

(58) Field of Search .............................. 310/50, 47, 46, 310/48, 53, 75 R, 83, 75 B, 99, 95; 74/354

(56) References Cited

U.S. PATENT DOCUMENTS 3,699,952 A * 10/1972 Waters et al. ................. 601/18
4,078,589 A * 3/1978 Miller ......................... 310/50
4,493,223 A * 1/1985 Kishi et al. .................... 74/371
4,760,751 A * 8/1988 Kasamatsu ................... 74/354
4,833,746 A * 5/1989 Yong ............................. 7/100
4,905,423 A * 3/1990 van Laere ................... 451/461
5,925,002 A * 7/1999 Wollman ..................... 601/70
6,176,322 B1 * 1/2001 Wadge ........................ 310/50

FOREIGN PATENT DOCUMENTS

JP 57154547 A * 9/1982 ............. F16H/3/34

* cited by examiner

*Primary Examiner*—Burton S. Mullins
*Assistant Examiner*—Yaveh Comas

(57) ABSTRACT

The holdable multi-functional rotary device comprises a casing suitable to be held by users. The interior thereof is formed with a receiving space for arranging a driving unit and a battery. The driving unit has a motor and a driving shaft extending out of the casing. The power of the motor and driving shaft is transferred by speed change gear set. By changing speed change gear set, the rotary speed of the driving shaft is changeable. A plurality of rotary pieces are arranged around the driving shaft. The rotary pieces are capable to achieving predetermined effects with the rotation of the driving shaft. Thereby, the whole rotary device can be combined with rotary pieces and the rotary speed of the rotary pieces are adjustable. The rotary pieces can be attached to a fan, a massage device, a dust absorbing mask, a shoe brush, a golf rod brush, etc.

7 Claims, 6 Drawing Sheets

HOLDABLE MULTI-FUNCTIONAL ROTARY DEVICE

FIELD OF THE INVENTION

The present invention relates to rotary devices, and particularly to a holdable multi-functional rotary device which can be attached to a fan, a massage device, a dust absorbing mask, a shoe brush, a golf rod brush, etc.

BACKGROUND OF THE INVENTION

In the daily life, rotary devices are frequently used at home or offices, such as used in fans, holdable massage devices, dust absorbers, etc. These devices are driven by motors and are used to rotary devices to present specific functions.

Moreover, since the rotary devices driven by motor are used to drive specific rotary bodies. The function thereof is confined and can not be extended. The customers must buy different rotary devices for matching different functional device so that a larger expenditure is necessary and this is not economic.

SUMMARY OF THE INVENTION

Accordingly, the primary object of the present invention is to provide a holdable multi-functional rotary device comprising a casing suitable to be held by users. The interior thereof is formed with a receiving space for arranging a driving unit and a battery. The driving unit has a motor and a driving shaft extending out of the casing. The power of the motor and driving shaft is transferred by a speed change gear set. By changing the speed change gear set, the rotary speed of the driving shaft is changeable. A plurality of rotary pieces are arranged around the driving shaft. The rotary pieces are capable to achieving predetermined effects with the rotation of the driving shaft. Thereby, the whole rotary device can be combined with rotary pieces and the rotary speed of the rotary pieces are adjustable. The rotary pieces can be attached to a fan, a massage device, a dust absorbing mask, a shoe brush, a golf rod brush, etc.

The various objects and advantages of the present invention will be more readily understood from the following detailed description when read in conjunction with the appended drawing.

Figure 1:
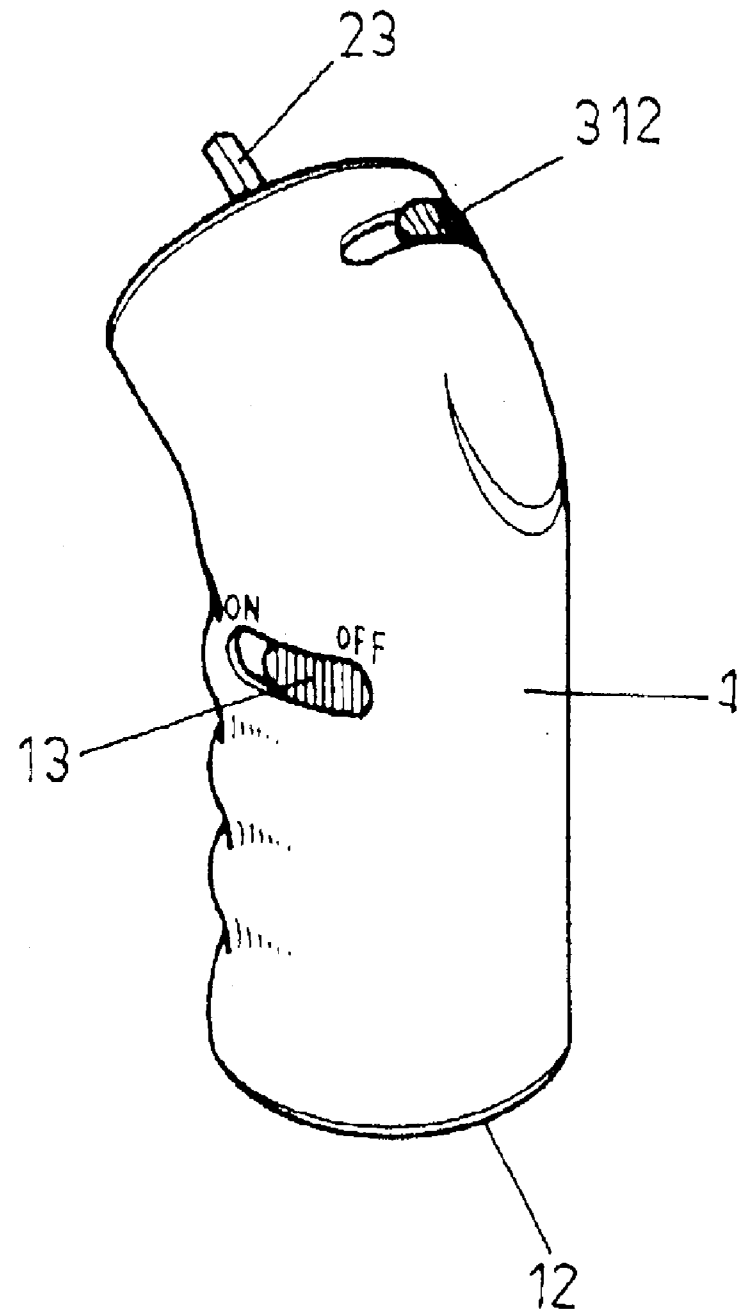
FIG. 1 shows the perspective view of the holdable multi-functional rotary device of the present invention.
Figure 2:
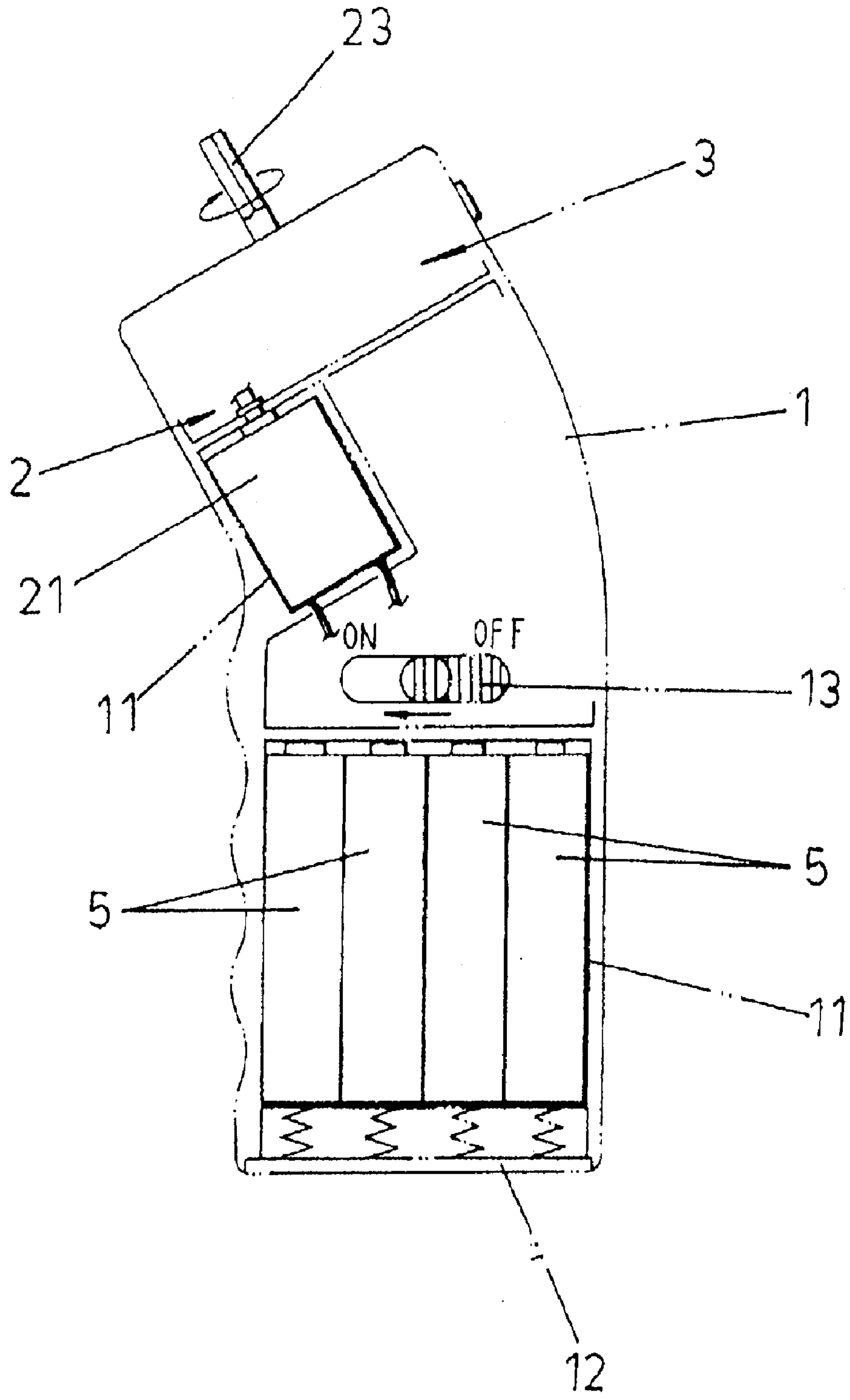
FIG. 2 is a lateral view showing the motor and battery within the interior of the casing according to the present invention.

The holdable multi-functional rotary device of the present invention has a structure illustrated in FIGS. 1 and 2. The holdable multifunctional rotary device comprises a casing 1 suitable to be held by users. The interior thereof is formed with a receiving space 11 for arranging a driving unit 2 and a battery 5. The casing 1 is installed with a power switch 13 for controlling the battery 5 and the driving unit 2 and a bottom thereof is installed with a cover 12 for updating the battery. The driving unit 2 has a motor 21 and a driving shaft 23 which extends out of the casing 1. The motor 21 and the driving unit 2 are driven by a speed change gear set 3 for changing the rotation speed of the driving shaft 23.

Figure 3:
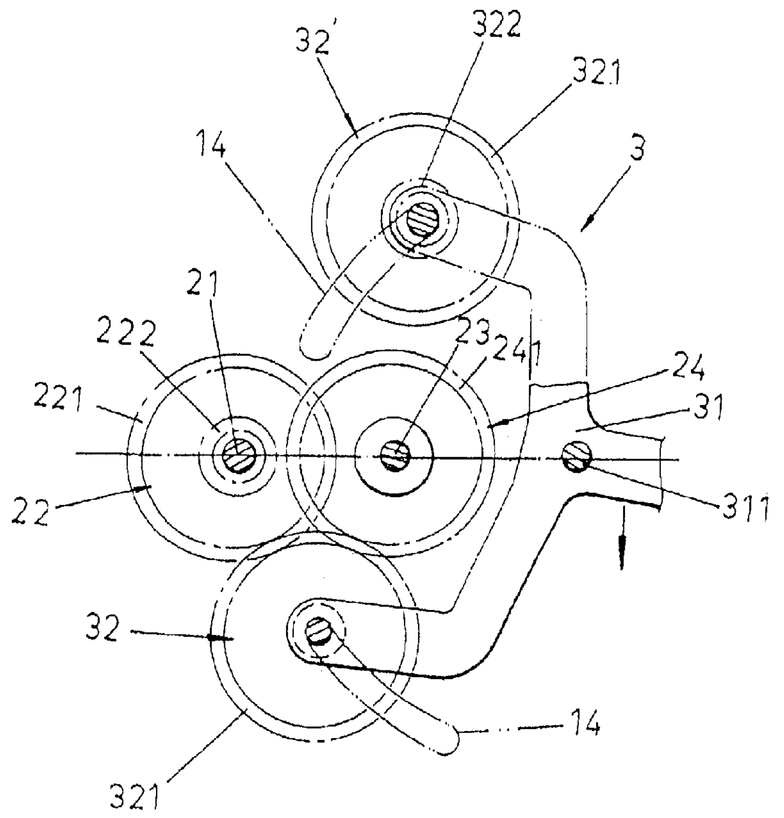
FIGS. 3 and 4 shows that the driving unit of the present invention rotates with a high speed.
Figure 4:
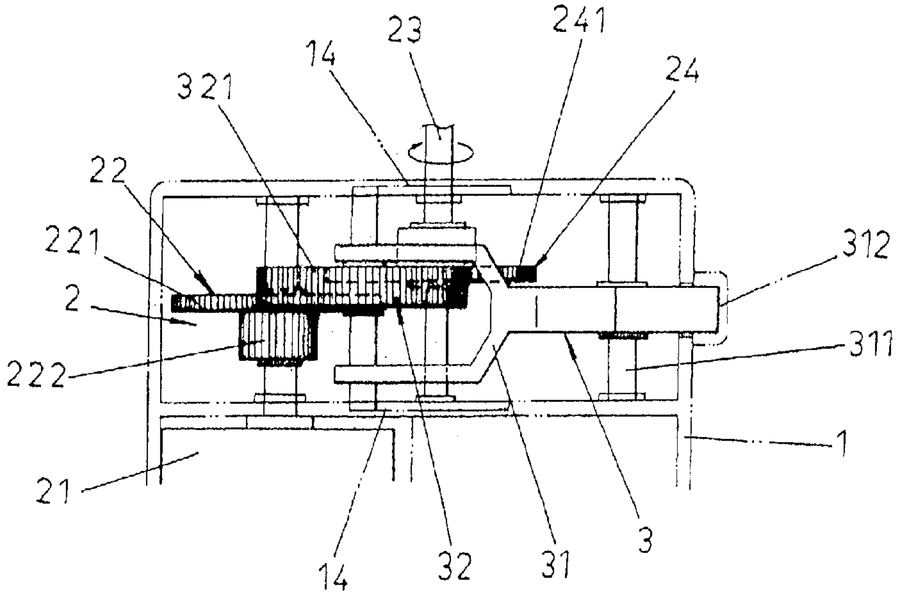

Referring to FIGS. 3 and 4, the central shaft and the driving shaft 23 of the motor 21 are firmly secured with a primary gear set 22 and a driven gear set 24 which includes a gear 241. The primary gear set 22 has a larger primary gear 221 and a small primary gear 222. The speed change gear set 3 has a gear frame 31 for axially installing a high speed driving gear set 32 and a low speed driving gear set 32'. The small speed gear set 32' has a lager driving gear 321 and a small driving gear 322 for matching the rotation speed of the gears. The gear frame 31 is pivoted to the lateral side of the motor 21 and the driving shaft 23 by a pivotal shaft 311. A distal end of the gear frame 31 extends to the exterior of the easing 1 to form with a button 312 (referring to FIG. 1). Thereby, the user can cause the gear frame 31 to swing around the pivotal shaft 311 by pushing the button 312. Thereby, the high speed driving gear set 32 is used to drive the driven gear set 24 by being driven by the primary gear set 22, or the low speed driving gear set 32' is used to drive the driven gear set 24 by being driven by the primary gear set 22.

Figure 5:
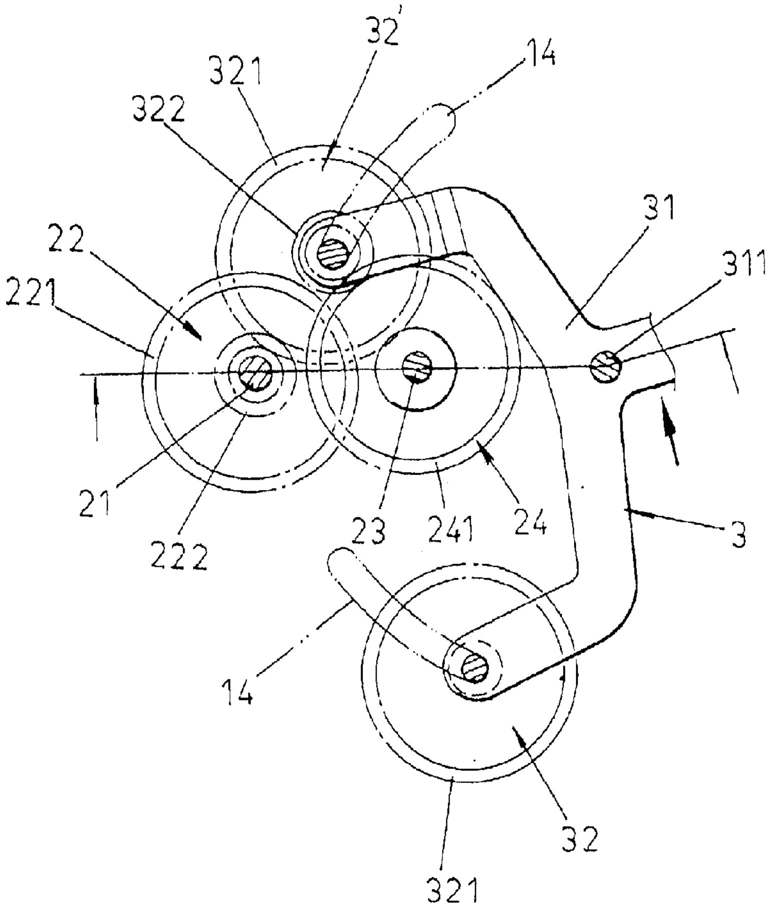
FIGS. 5 and 6 shows that the driving unit of the present invention rotates with a lower rotary speed.
Figure 6:
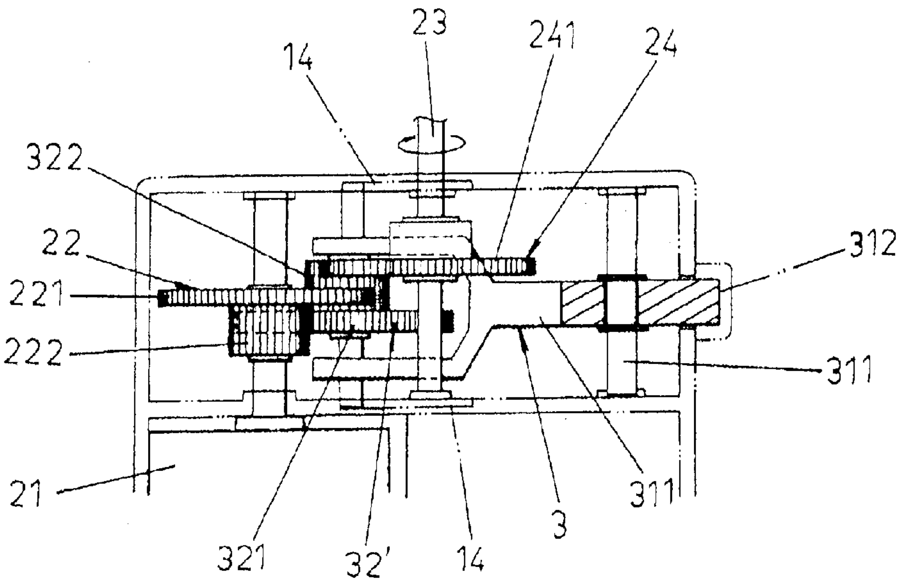

At first, with reference to FIGS. 3 and 4, it is illustrated that the driving unit 2 rotates with a high speed. The high speed driving gear set 32 is used to drive the driven gear set 24 by being driven by the primary gear set 22 so that the larger primary gear 221 of the primary gear set 22 is engaged with the high speed driving gear set 32. Meanwhile, the high speed driving gear set 32 is engaged to the driven gear set 24. The high speed driving gear set 32 is engaged to the driven gear set 24 and the motor 21 drives the driving rotary shaft 23 to rotate. Moreover, when the user switches the button 312 to be at the conditions illustrated in FIGS. 5 and 6. The low speed driving gear set 32' serves to drive the driven gear set 24 by being driven by the primary gear set 22. The large driving gear 321 of the low speed driving gear set 32' is engaged to the small primary gear 222 of the primary gear set 22. Then, the small driven gear 322 of the low speed driving gear set 32' is engaged to the driven gear set 24. The rotation number of gears at the rear section can be reduced by increasing the number of the teeth of the gear so that the motor 21 can drive the driving shaft 23 with a lower speed. Moreover, the casing 1 can be installed with a guide groove 14 which is matched with the swinging range of the gear frame 31 so as to guide the gear frame 31 to swing according to predetermined moving trace. Moreover, the button 312 is installed with a positioning piece (not shown) for swinging the gear frame 31 to a predetermined point to sustain the speed change gear set 3, motor 21 and the driving shaft 23 have a steady driving relation.

Figure 9:
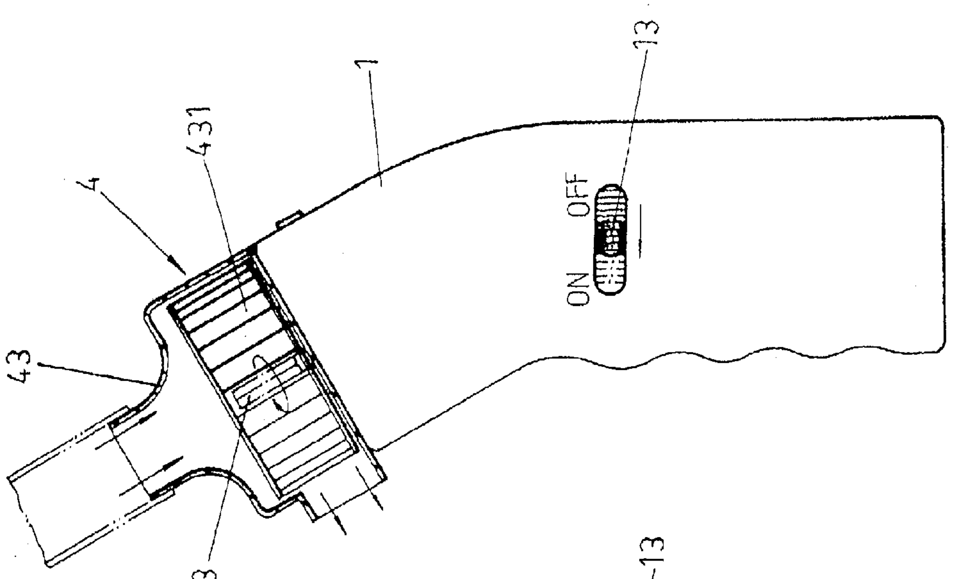
FIG. 9 shows that the rotary device of the present invention is used to a dust absorbing mask.
Figure 8:
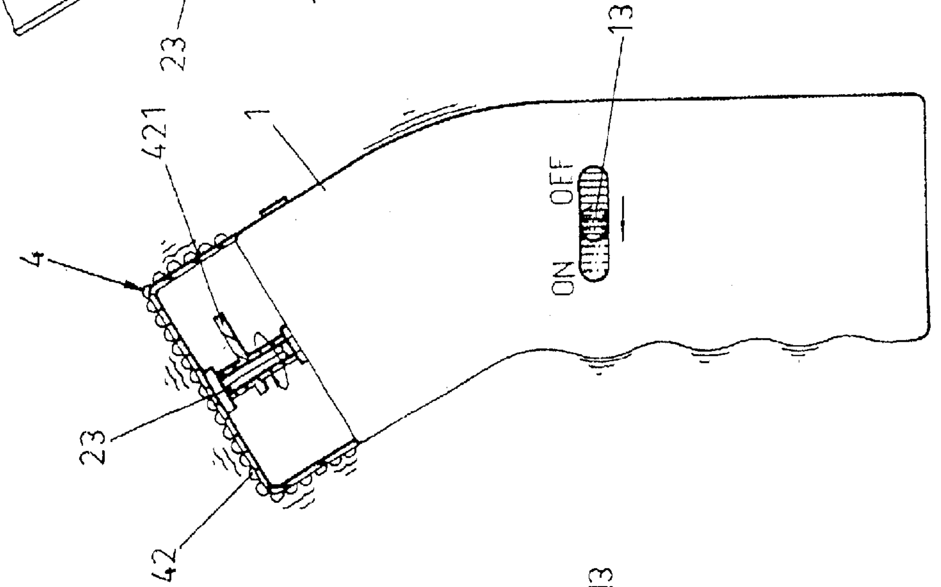
FIG. 8 shows that the rotary device of the present invention is used to a massage device.
Figure 7:
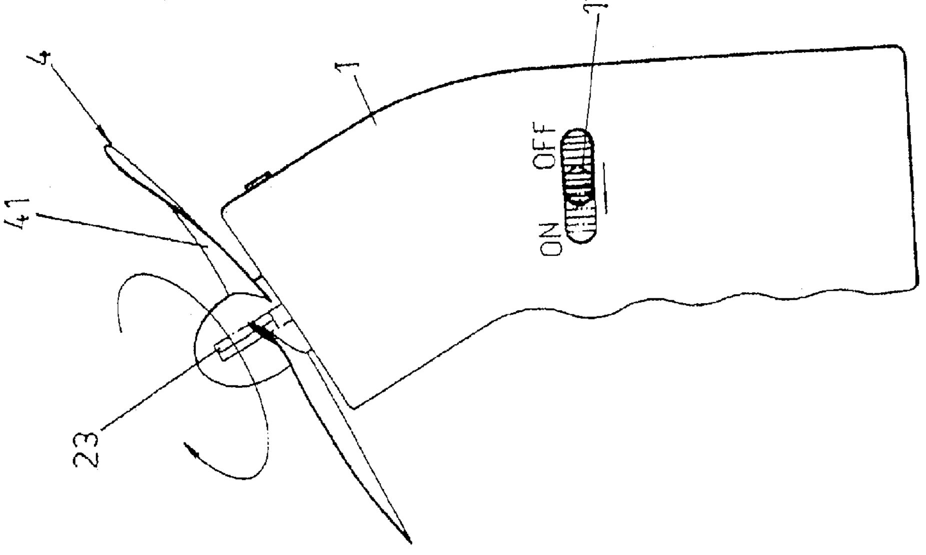
FIG. 7 shows that the rotary device of the present invention is used to a fan.
Figure 11:
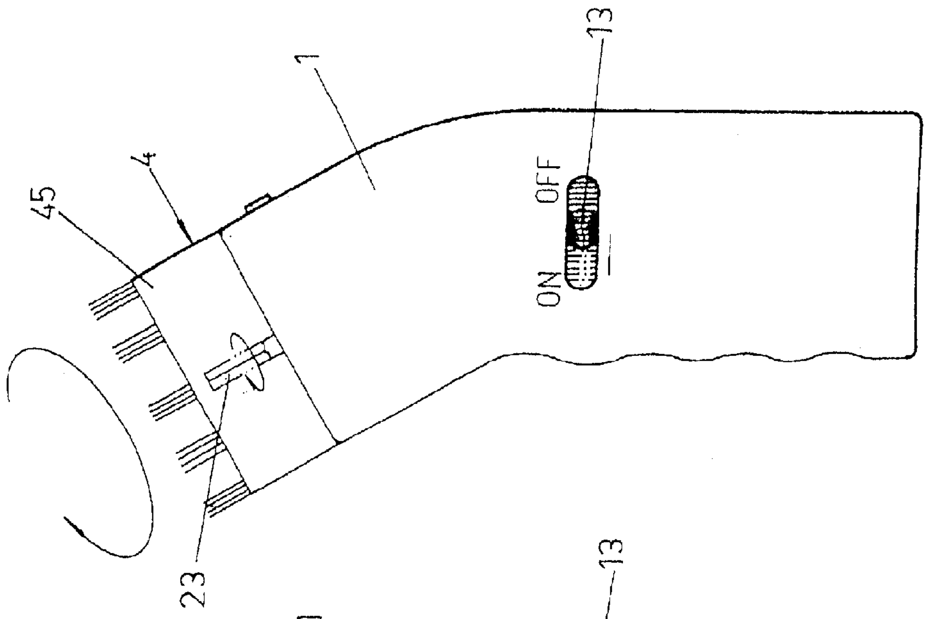
FIG. 11 shows that the rotary device of the present invention is used to a sole brush.
Figure 12:
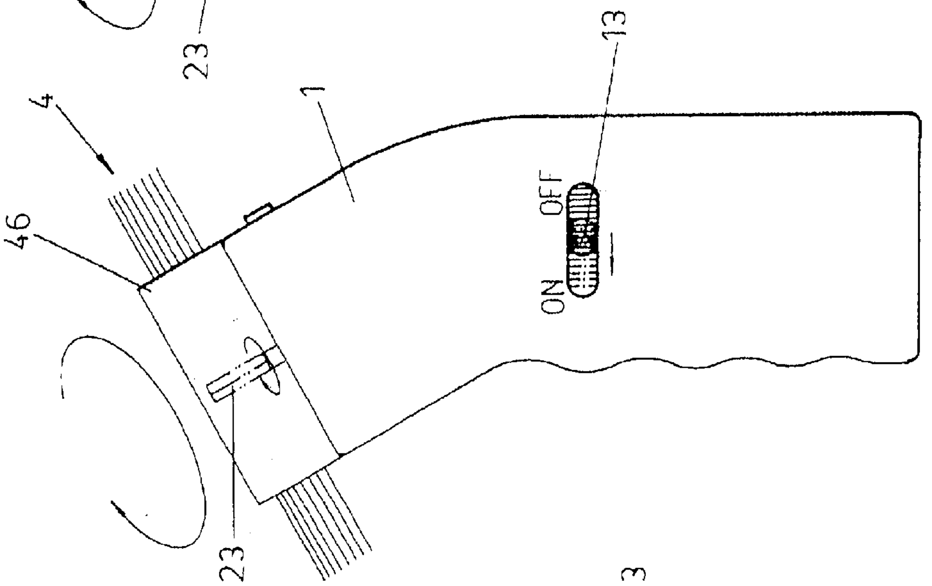
FIG. 12 shows that the rotary device of the present invention is used to a golf rod brush.
Figure 10:
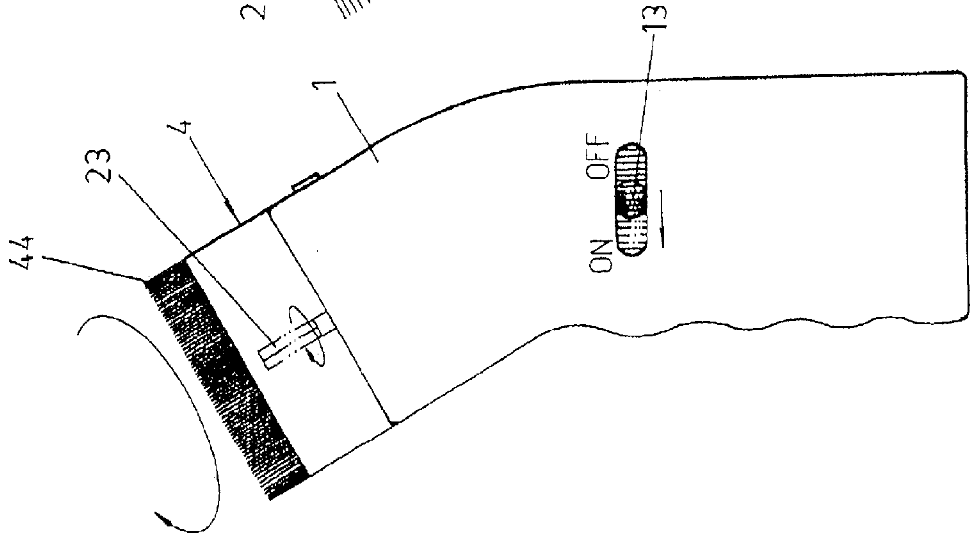
FIG. 10 shows that the rotary device of the present invention is used to a shoe brush.

Thereby, when the holdable multi-functional rotary device of the present invention is used, as illustrated in FIGS. 7 and 12, a plurality of rotary pieces 4 are engaged to the driving shaft 23 so as to achieve some predetermined effect with the rotation of the driving shaft 23. Moreover, the user may update rotary pieces 4 as required. As shown in the FIG. 7, the user may use the rotary pieces 4 made from soft blades to be assembled around the driving shaft 23 so that the whole holdable multi-functional rotary device 41 becomes a holdable fan. Referring to the FIG. 8, the user may engage the rotary pieces 4 with the massaging covers 42 on the driving shaft 23. Then the eccentric shaft 421 of the massaging cover 42 is engaged to the driving shaft 23 so that the whole rotary device is holdable. As shown in the FIG. 9, a rotary piece 4 with dust absorbing mask 43 is engaged to the driving shaft 23, and the spiral fan 431 of the dust absorbing mask 43 is engaged to the driving shaft 23 so that the whole dust absorbing mask 43 becomes a holdable dust absorbing mask 43. As shown in the FIGS. 10 and 1, the rotary piece 4 can be installed with a soft brush cover 44 or a hard brush cover 45 and then is installed to the driving shaft 23 so that the soft brush cover 44 and hard brush cover 45 rotates with the rotation of the driving shaft 23. Thereby, the whole rotary device becomes a shoe brush or a sole brush. Moreover, referring to FIG. 12, the rotary piece 4 with lateral brush cover 46 is engaged to the driving shaft 23 so that the whole rotary piece 4 becomes a golf rod brush.

The holdable multi-functional rotary device comprises a casing suitable to be held by users. The interior thereof is formed with a receiving space for arranging a driving unit and a battery. The driving unit has a motor and a driving shaft extending out of the casing. The power of the motor and driving shaft is transferred by speed change gear set. By changing speed change gear set, the rotary speed of the driving shaft is changeable. A plurality of rotary pieces are arranged around the driving shaft. The rotary pieces are capable to achieving predetermined effects with the rotation of the driving shaft. Thereby, the whole rotary device can be combined with rotary pieces and the rotary speed of the rotary pieces are adjustable. The rotary pieces can be attached to a fan, a massage device, a dust absorbing mask, a shoe brush, a golf rod brush, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A holdable multi-functional rotary device comprising:

a casing suitable to be held by users; an interior thereof being formed with a receiving space;

a battery received in the receiving space of the casing;

a driving unit received in the receiving space of the casing; and including a motor; a spindle of the motor is engaged with a primary gear set which includes a larger primary gear and a small gear set; and a driving shaft extending out of the casing; and a driven gear set being firmly secured to the driving shaft;

a power switch installed in the casing for electrically enabling the battery and the driving unit;

a speed change gear set driving by the motor for driving the driving unit; the speed change gear set comprising:

a gear frame pivoted to a lateral side of the motor and the driving shaft by a pivotal shaft; a distal end of the gear frame extending to an exterior of the casing to be mounted with a button; a button mounted at the distal end of the gear frame extending out of the casing for swinging the gear frame to predetermined positions;

a high speed driving gear set axially installed at one end of the gear frame for transferring rotation power from the primary gear set to the driven gear set;

a lower speed driving gear set axially installed at another and of the gear frame for transferring rotation power from the primary gear set to the driven gear set; the low speed driving gear set having a large driving gear and a small driving gear;

a plurality of rotary pieces arranged around the driving shaft; the rotary pieces presenting its function by rotating the driving shaft;

a cover installed in a bottom of the casing for updating the battery; the casing being installed with a guide groove which is matched with a swinging range of the gear frame so as to guide the gear frame to swing according to a predetermined moving trace;

wherein the gear frame is capable of swinging around the pivotal shaft by pushing the button; when the high speed driving gear set is in contact with the primary gear set and the driven gear set; the driving shaft securing the driving gear set will have a high rotation speed; and when the low speed driving gear set is in contact with the primary gear set and the driven gear set; the driving shaft securing the driving gear set will have a low rotation speed.

2. The holdable multi-functional rotary device as claim in claim 1, wherein the rotary pieces are blades made of soft materials.

3. The holdable multi-functional rotary device as claim in claim 1, wherein the rotary pieces are engaged with a massage cover and the massage cover has an eccentric shaft engageable with the driving shaft.

4. The holdable multi-functional rotary device as claim in claim 1, wherein the rotary pieces are attached with a dust absorbing mask; the dust absorbing mask has a spiral fan which is engageable with the driving shaft.

5. The holdable multi-functional rotary device as claim in claim 1, wherein the rotary pieces are attached to a soft brush cover.

6. The holdable multi-functional rotary device as claim in claim 1, wherein the rotary pieces are attached to a hard brush cover.

7. The holdable multi-functional rotary device as claim in claim 1, wherein the rotary pieces are attached with a lateral brush cover.

* * * * *